UNITED STATES PATENT OFFICE.

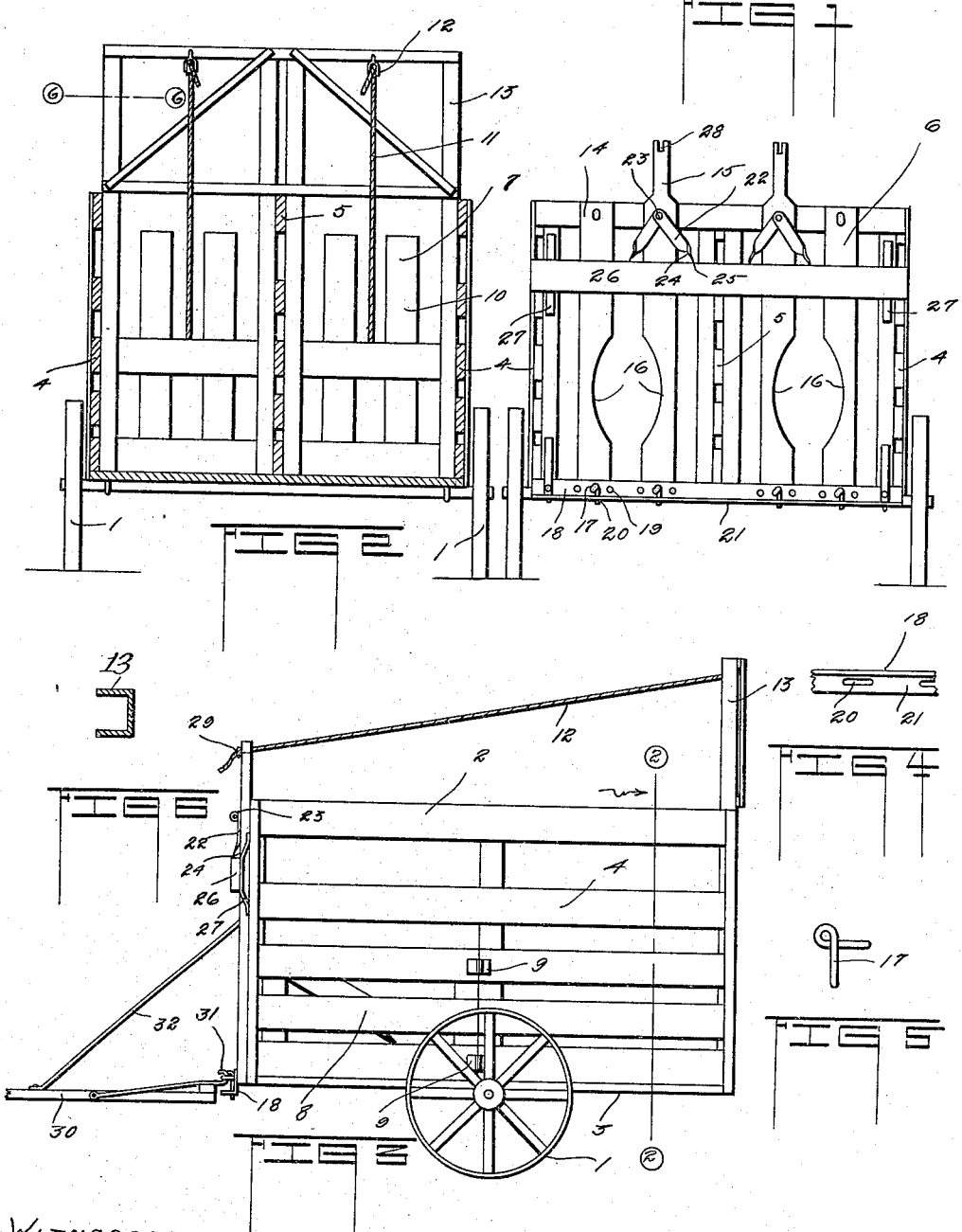

EDGAR G. MILLER, OF MAROA, AND FRED D. MILLER, OF CLINTON, ILLINOIS.

HOG-CRATE.

1,147,879.  Specification of Letters Patent.  Patented July 27, 1915.

Application filed May 24, 1913. Serial No. 769,691.

*To all whom it may concern:*

Be it known that we, EDGAR G. MILLER, citizen of the United States, residing in the town of Maroa, county of Macon, and State of Illinois, and FRED D. MILLER, a citizen of the United States, residing in the town of Clinton, in the county of Dewitt and State of Illinois, have invented certain new and useful Improvements in Hog-Crates, of which the following is a specification.

Our invention relates to improvements in hog traps or crates and is designed to produce an improved apparatus for catching and holding hogs and small live stock, for ringing, branding, veterinary or other purposes, which is simple in construction and efficient in operation.

To the accomplishment of the foregoing and such other objects as may hereinafter appear our invention consists in the construction, combination and arrangement of parts hereinafter described and then sought to be defined in the appended claims, reference being had to the accompanying drawings forming a part hereof and which show for the purpose of illustrative disclosure a preferred embodiment of our invention, it being understood that various changes may be made in practice within the scope of the claims without digressing from our inventive idea.

Referring now to the drawings, Figure 1 represents a front view of a device constructed according to our invention; Fig. 2 is a vertical section taken substantially on line 2—2 of Fig. 3; Fig. 3 is a side elevation; Fig. 4 is a detail view of part of the securing plate; Fig. 5 is a detail view of the securing pin; Fig. 6 is a section on line 6—6 of Fig. 2 showing the guides for the sliding doors.

Throughout the drawings corresponding parts are indicated by the same reference characters.

Referring now to the drawings, the numeral 1 designates the supporting wheels, and the numeral 2 designates the crate or trap as a whole. It is in the form of a rectangular box having the bottom member 3 and the side members 4, the intermediate members 5, the front end 6 and the rear end 7. In the forward portion of each side 4 is provided the door 8 which is hinged as at 9 so as to permit the escape of the animal. The animal is admitted at the rear end which is normally closed by means of the vertically sliding doors 10, which are composed of slats as shown, and are raised and lowered by means of the flexible connecting members 11 operating through pulleys 12 on the extended super-structure 13, the flexible connecting members 12 extending to the forward portion of the frame as shown in Fig. 1, as will presently be described.

Mounted in the forward end of each compartment are the gripping members or levers 14 and 15 which have the cut-out portion 16 adapted to approximate the shape of the neck of the animal. The shorter gripping member or lever is substantially as long as the crate is high having its lower end adjustably secured by means of the pin 17 to the plate 18, a plurality of apertures 19 being formed in the plate, and said pin 17 having a right angled extension fitting in one of said apertures, the other extension of said pin fitting in one of the slots 20 in the horizontal flange 21, of said plate 18. The gripping lever or member 15 has its lower end portion adjustably secured in the same manner as the gripping lever or member 14 but the upper portion thereof is provided with a securing means which permits said gripping lever or member being moved to and from the stationary gripping member or lever 14. This locking means takes the form of a plurality of bars or members 22 pivoted as at 23, and having the right angled turn 24 to provide the flat bearing edge 25 which bears on the transverse bar 26, supported by means of brackets 27. It is obvious that when one of the gripping levers or members 15 is properly positioned and the locking plates are in the position shown in Fig. 1, that the gripping lever or member 15 cannot be moved. If it is desired to move said gripping lever or member, the locking plate on the side thereof toward which it is desired to move said gripping lever or member must be lifted, when the gripping lever or member may be freely moved in that direction for gripping the animal or releasing the same.

It is to be noted that the gripping lever or member is extended upwardly and provided with the notch 28, the notch being designed to receive the rope of flexible connector 12, a knot 29 being provided therein for holding the flexible connector 12 in any desired position to secure the door 10 as desired.

It is to be noted that the partition 5 divides the crate or trap into two compartments so that two animals may be handled at once, each compartment having its own entrance, and its own discharge door or gate. The frame of the device is suitably reinforced by angle iron and the doors 10 slide in channel iron strips, this being the preferred form. We also utilize the tongue 30 which may be attached to the plate 18 by means of the hooked members 31, having the additional brace member 32. The device may be lifted off the wheels and set on the ground and the tongue removed to facilitate the operation. It is therefore obvious that we have provided in a simple construction an apparatus which operates efficiently to provide means whereby the animal may be firmly held and may be released readily. The particular lock for the movable gripping lever or member allows for any desired adjustment and may be readily released.

What we claim is:—

1. In an apparatus of the character described and in combination, a crate having doors, a plate member extending along the lower edge of the front portion, said plate member being provided with a vertical flange and a horizontal flange, and having a plurality of apertures in the vertical flange and a plurality of slots in the horizontal flange, gripping members or levers adapted to be adjustably secured to said plate member, securing members for securing said gripping members or levers to said plate members, each securing member having an extension adapted to pass through said gripping members or levers and one of said apertures, and another extension adapted to fit in one of said slots for locking the securing member in position, one of said gripping members or levers being pivotally mounted so as to be moved to and from the other gripping lever or member.

2. In an apparatus of the character described, and in combination, a crate having doors, a plate member extending along the lower edge of the front portion, said plate member being provided with a vertical flange and a horizontal flange, and having a plurality of apertures in the vertical flange and a plurality of slots in the horizontal flange, gripping members or levers adapted to be adjustably secured to said plate member, securing members for securing said gripping members or levers to said plate members, each securing member having an extension adapted to pass through said gripping members or levers and one of said apertures, and another extension adapted to fit in one of said slots for locking the securing member in position, one of said gripping members or levers being pivotally mounted so as to be moved to and from the other gripping lever or member, and means for locking said gripping lever or member against movement in either direction in any position.

In testimony whereof we affix our signatures in the presence of two witnesses.

EDGAR G. MILLER.
FRED D. MILLER.

Witnesses:
NORA GRAHAM,
W. H. GREEN.

Copies of this patent may be obtained for five cents each, by addressing the "Commissioner of Patents, Washington, D. C."